US008464863B2

(12) United States Patent
Pierret et al.

(10) Patent No.: US 8,464,863 B2
(45) Date of Patent: Jun. 18, 2013

(54) CUTTING MACHINES (76) Inventors: Philippe Pierret, Corbion (BE); Thierry Pierret, Sainte-Marie/Semois (BE)

( * ) Notice: Subject to any disclaimer, the term of this patent is extended or adjusted under 35 U.S.C. 154(b) by 128 days.

(21) Appl. No.: 13/184,880

(22) Filed: Jul. 18, 2011

(65) Prior Publication Data
US 2012/0018284 A1 Jan. 26, 2012

(30) Foreign Application Priority Data

Jul. 23, 2010 (EP) .................................... 10170720

(51) Int. Cl.
 B65G 23/04 (2006.01)
(52) U.S. Cl.
 USPC .............................. 198/835; 198/780; 193/37
(58) Field of Classification Search
 USPC ... 198/835, 780, 781.07, 781.11, 791; 193/37
 See application file for complete search history.

(56) References Cited

U.S. PATENT DOCUMENTS

| | | | | |
|---|---|---|---|---|
| 2,719,163 | A | | 10/1955 | Bamford |
| 3,610,387 | A | * | 10/1971 | Vom Stein ...................... 193/37 |
| 3,667,589 | A | * | 6/1972 | Constable ...................... 198/789 |
| 4,495,683 | A | * | 1/1985 | Delhaes .......................... 193/37 |
| 5,700,347 | A | * | 12/1997 | McCowin ...................... 156/425 |
| 5,722,888 | A | * | 3/1998 | Lane ............................. 198/780 |
| 6,422,382 | B1 | * | 7/2002 | Ertel et al. .................. 198/860.1 |
| 2005/0173226 | A1 | * | 8/2005 | Gold et al. .................... 198/570 |

FOREIGN PATENT DOCUMENTS

| | | |
|---|---|---|
| BE | 1000675 A3 | 3/1989 |
| EP | 0553656 A1 | 8/1993 |
| FR | 27842465 A1 | 2/2000 |

OTHER PUBLICATIONS

"Wälzlager Begriffe and Definitionen", Deutsch Norm, No. DIN 5593, Sep. 1, 1999, pp. 1-3, XP007916847.

* cited by examiner

Primary Examiner — James R Bidwell
(74) Attorney, Agent, or Firm — Jacobson Holman PLLC (57) ABSTRACT A drive roller assembly for cutting machinery is connected to a drive motor via a drive train to drive a drive belt within the machinery, and the drive roller assembly is configured such that, when the drive belt needs to be changed, the entire assembly can easily be removed and replaced without having to dismantle the assembly or disturb any other mechanisms in the vicinity of the drive roller assembly, as the drive roller assembly includes a drive shaft that has a first end and a second end, a split ring located on the first end of the shaft between a first bearing and the first end of the shaft, the split ring having a conical surface that fixes the first bearing relative to the first end of the shaft, on the second end of the shaft a second bearing is provided that is retained within a housing, and the housing is removably mounted on the machinery.

18 Claims, 8 Drawing Sheets

CUTTING MACHINES

This application claims the priority of European number 10170720.6 filed Jul. 23, 2010, hereby incorporated by reference.

The present invention relates to improvements in or relating to cutting machines and is more particularly concerned with the demounting of a drive roller assembly in order to replace a drive belt.

BE-A-1000675 discloses a fibre cutting machine in which fibres are aligned in a direction which is substantially perpendicular to the vertical plane of an edge of a fixed cutting blade to form a band. The band is conveyed step-by-step towards the fixed cutting blade and at least one mobile cutting blade and is supported in the vicinity of the fixed cutting blade so that its bottom face and lateral faces are each supported by a surface. Contacting surfaces grip the band as it is advanced towards the cutting blades by an amount equal to the length of the fibre sections to be cut. The band is brought to a temporary standstill and is clamped between support surfaces so that a portion of the band extends between the mobile and fixed cutting blades. The mobile cutting blade moves towards and past the fixed cutting blade to sever the band of fibres so that the fibres are cut to a predetermined size or length. Once the fibres have been cut, the band is released by the supporting surfaces and the contacting surfaces move away from the vicinity of the fixed cutting blade to grip the band at a predetermined distance away therefrom to advance the band towards the fixed cutting blade. The supporting surfaces, the contacting surfaces and the mobile cutting blade operate in synchronism to move the band and clamp it in position during the cutting phase.

The band is transported through the cutting machine by means of a drive belt driven by a motor via a drive roller assembly. When the drive belt needs to be changed, the drive roller assembly needs to be removed from the machine and often necessitates that the drive roller assembly as well as its neighbouring mechanism being dismantled. Such dismantling increases the wear and possibility of damage on components within the drive roller assembly.

GB-A-15398 (British Patent granted in 1909) discloses a mounting for friction bearings in which a conical split ring is used to mount a ball bearing (sometimes called a ball bearing race) on a shaft. In one embodiment, the shaft has the conical split ring mounted on it directly and provides a conical external surface. The inner casing of the ball bearing has an internal surface that is conical in shape and is mounted over the conical split ring. In another embodiment, the conical split ring is interposed between an external conical surface mounted on a shaft and an internal ring of a ball bearing. In this embodiment, the inner casing of the ball bearing has a cylindrical surface. In each embodiment, at one end of the conical split ring, a coarse thread is provided on an external surface thereof. A threaded nut is tightened on the coarse thread to push the ball bearing further onto the shaft over the conical split ring. This effectively binds the ball bearing firmly to the conical split ring and onto the shaft.

It is therefore an object of the present invention to provide an arrangement for removably mounting a drive roller assembly within cutting machinery to facilitate the changing of the drive belt.

In accordance with one aspect of the present invention, there is provided a machine comprising a frame and a drive roller assembly mounted in the frame, said machine further comprising a first and a second bearing for mounting said drive roller assembly, said drive roller assembly comprising a shaft having a first end and a second end, and on which a drive roller is mounted between the first end and the second end, the first end of the shaft being lodged in the first bearing and the second end of the shaft being lodged in the second bearing, the drive roller assembly also comprises a drive member attached to the second end of the shaft, characterised in that the drive roller assembly further comprises a split ring located on the first end of the shaft between the first bearing and the first end of the shaft, the split ring having a conical surface that positions the first end of the shaft relative to the first bearing, the second bearing being mounted in a housing, which is removably mounted on the frame. The use of the split ring enables a correct positioning of the shaft with respect to the first bearing and the fact that the second bearing is lodged in the housing enables an easy removal without having to access inside the machine.

Ideally, the split ring has a cylindrical external surface on which the first bearing is located. This means that there is no need to modify the first bearing and that it can readily be obtained.

The drive roller assembly may further comprise a locking arrangement that effects positioning of the first bearing relative to the first end of the shaft by engaging with a surface of the split ring. In the described embodiment, the surface of the split ring comprises a shoulder extending outwardly from the conical surface of the split ring.

The first end of the shaft may include a threaded portion and the locking arrangement comprises a nut that engages the threaded portion and abuts the surface of the split ring to move the split ring towards the drive roller to fix the first bearing in position.

The invention also relates to a drive roller assembly to be used as a component of the machine.

For a better understanding of the present invention, reference will now be made, by way of example only, to the accompanying drawings in which.

Whilst the present invention will be described with reference to drive roller assembly for cutting machinery, it will readily be appreciated that the present invention can be used in other applications where it is necessary to remove and put back in place a drive roller assembly without having to remove or dismantle a large number of components in the vicinity of the drive roller assembly.

Figure 1A:
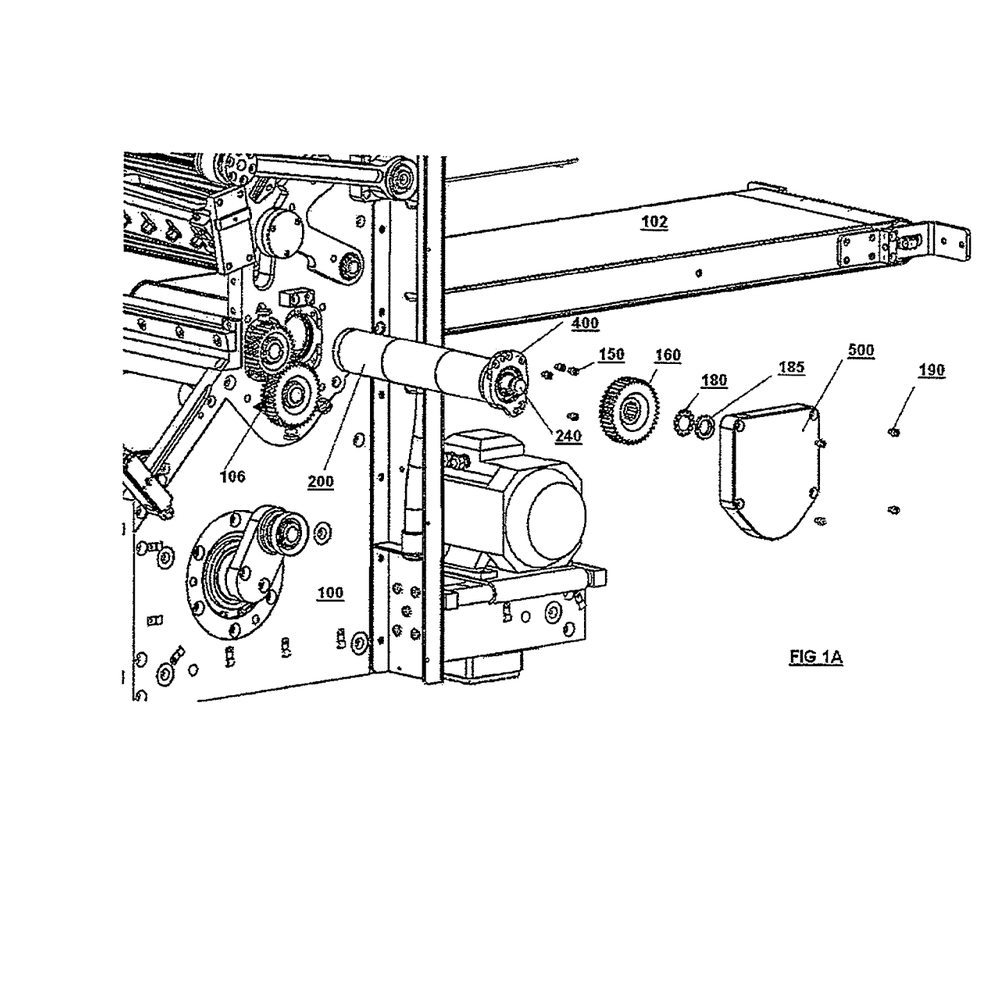
FIGS. 1a,b,c and d illustrate, partially in an exploded view, a drive roller assembly in accordance with the present invention as a component of a cutting machine.
Figure 1B:
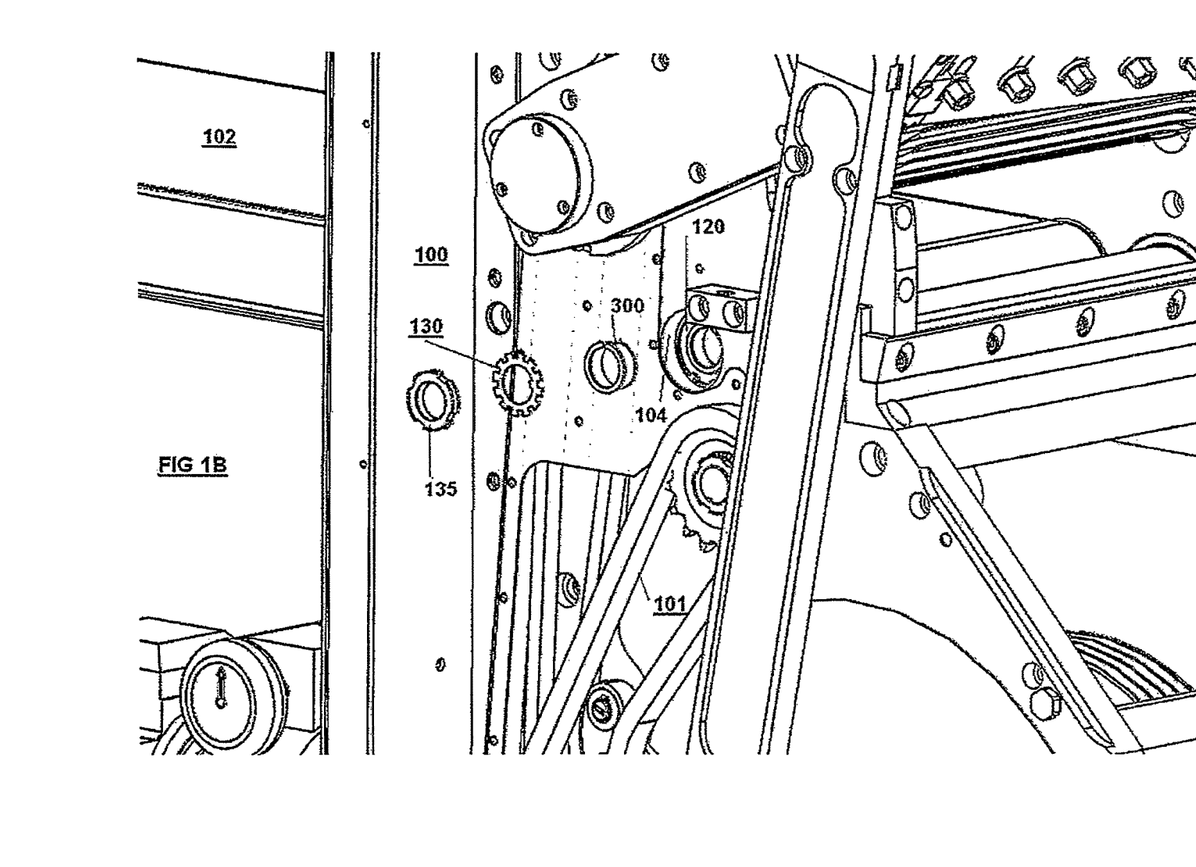
Figure 1C:
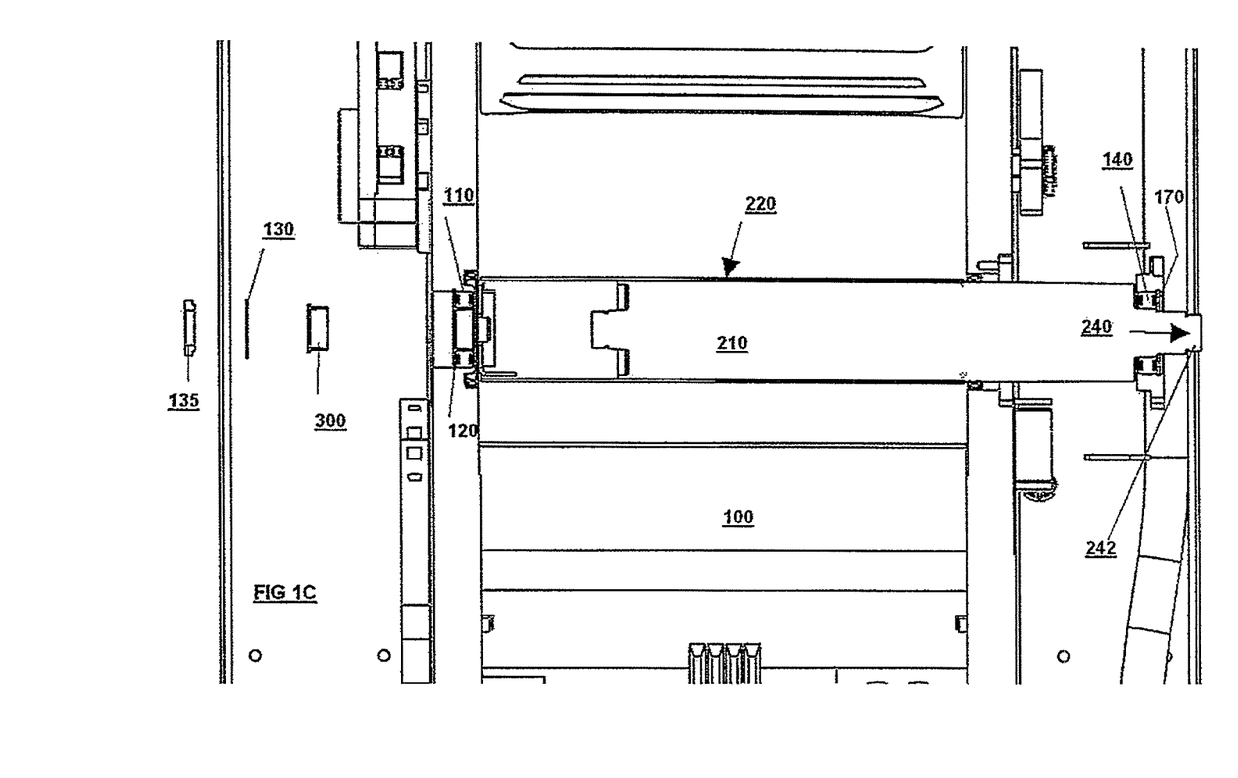
Figure 1D:
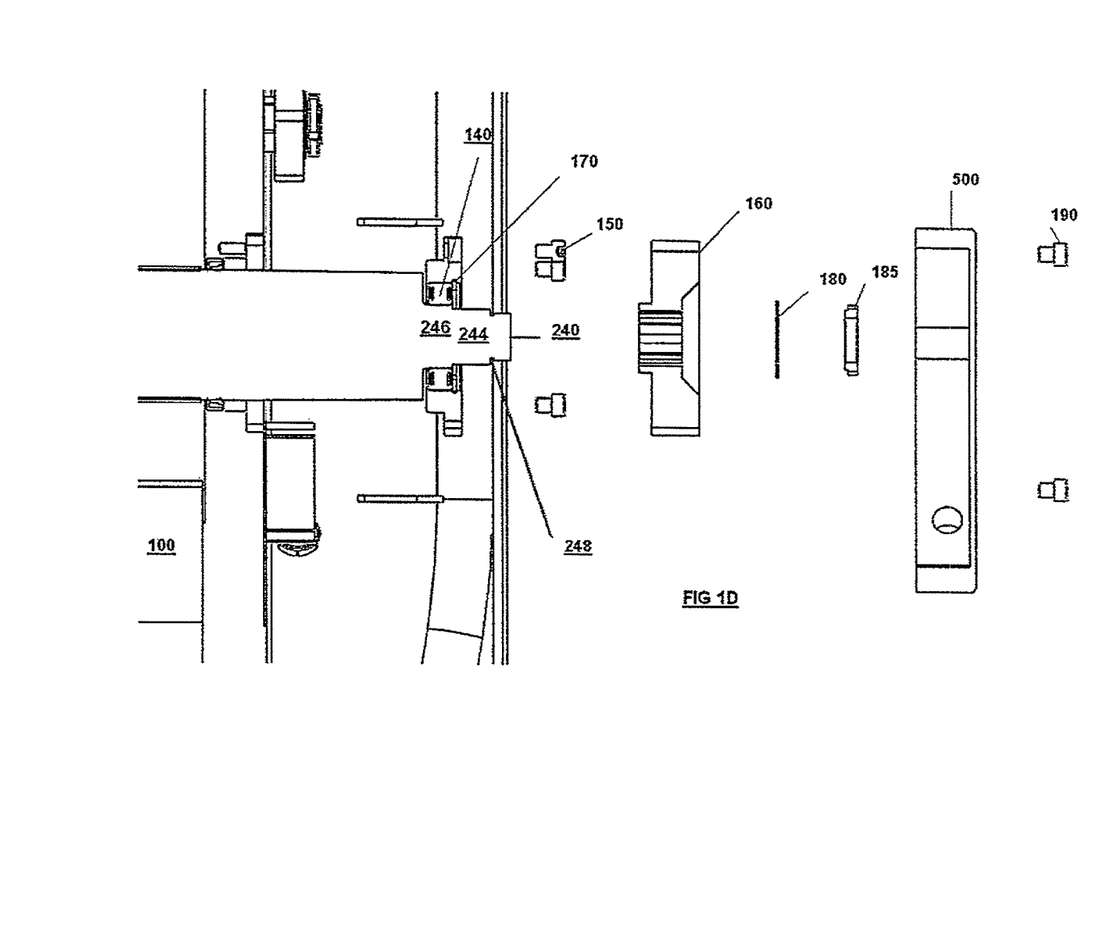

Referring initially to the FIGS. 1*a,b,c*, and *d*, a cutting machine 100 is partially shown. FIGS. 1*a* and *d* show one lateral side, the right hand side when standing in front of the machine, and FIG. 1*b* shows the other lateral side, i.e. the left hand side. FIG. 1*c* shows a cross section in vertical direction through the machine at a place where the drive roller is located. The drive roller 200 crosses the cutting machinery in a horizontal direction. The drive roller 200 comprises a drive shaft 210 on which is mounted a roller portion 220 that engages with a drive belt 102 for transporting material to be cut through the cutting machine 100. The drive roller is connected to a motor (not shown) for example by means of a drive chain 101. First and second bearings preferably formed by ball bearings 110 and 140 are provided on each lateral side for mounting the drive shaft.

As shown in the FIGS. 1*b* and 2 to 4, the drive shaft 210 has a first end 230. having a threaded portion 232, a conical external surface portion 234, and a groove 236 located between the threaded portion 232 and the conical external surface portion 234.

Figures 2, 3:
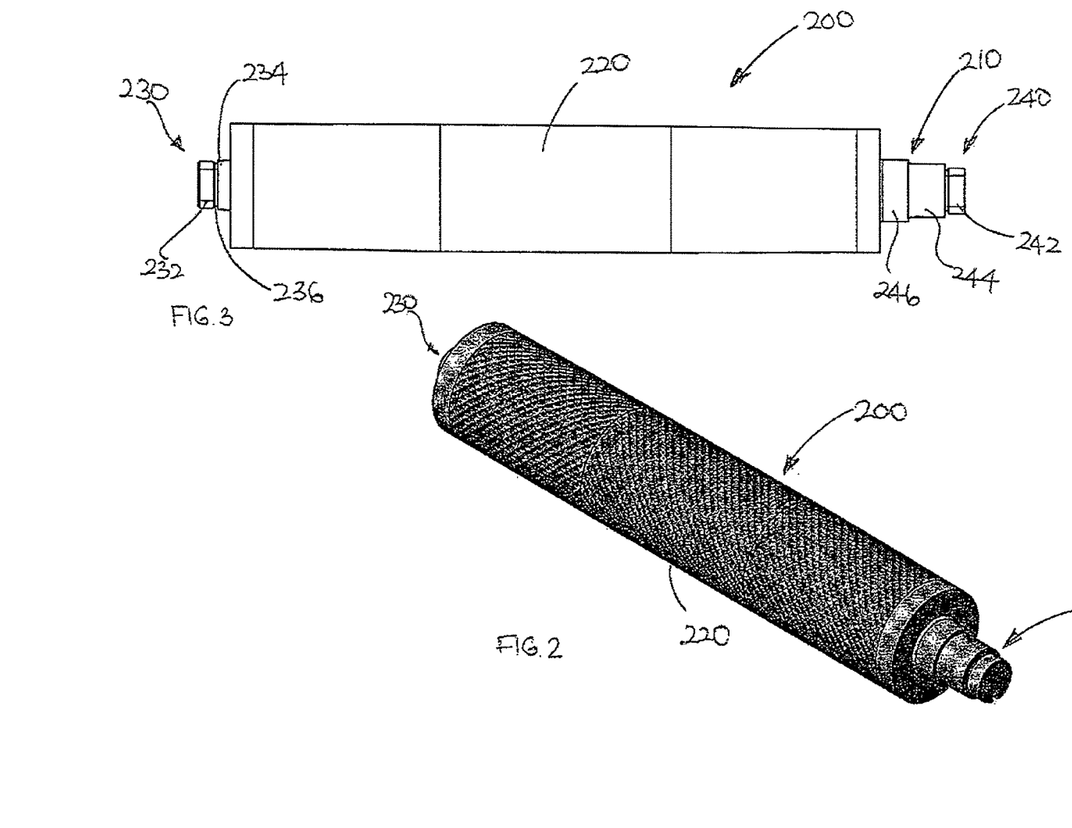
FIG. 2 illustrates a perspective view of a drive roller in accordance with the present invention.
FIG. 3 illustrates a plan view of the drive roller shown in FIG. 2.
Figure 4:
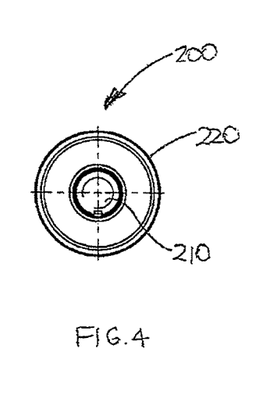
FIG. 4 illustrates an end elevation of the drive roller shown in FIGS. 2 to 4.

As shown in FIGS. 1*c+d* and FIGS. 2 to 4, the drive shaft has a second end 240 having a threaded portion 242 and two cylindrical portions 244, 246 of different diameters. The threaded portion 242 is separated from the two cylindrical portions 244, 246 by a groove 248.

The machine 100 has a frame which has a portion adapted to receive the first end 230. The frame portion includes a recess 104 sized to receive the ball bearing 110. The threaded portion 232 of the first end 230 remains accessible through the adapted frame portion.

The conical external surface portion 234 of the first end 230 provides a surface onto which a conical split ring 300 is mounted. The conical split ring 300 is described in more detail below with reference to FIGS. 5 to 7, and its operation is described in more detail below with reference to FIG. 1.

Figures 5, 6:
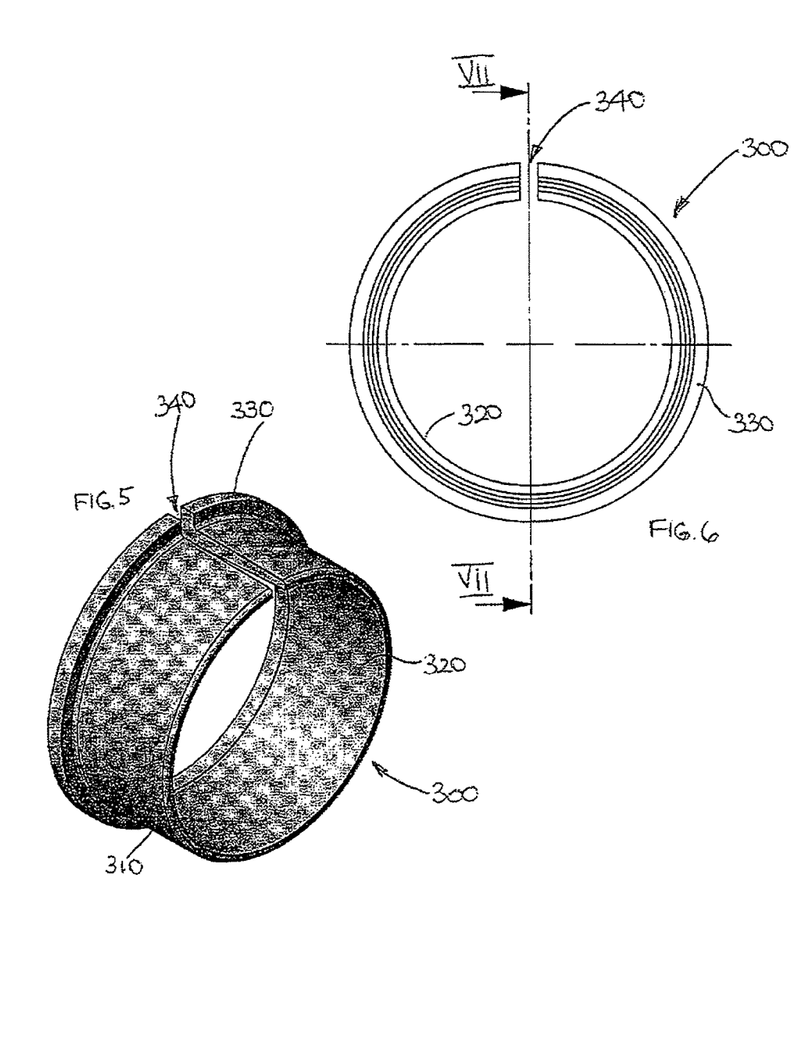
FIG. 5 illustrates a perspective view of a conical split ring in accordance with the present invention.
FIG. 6 illustrates a plan view of the conical split ring shown in FIG. 5.
Figure 7:
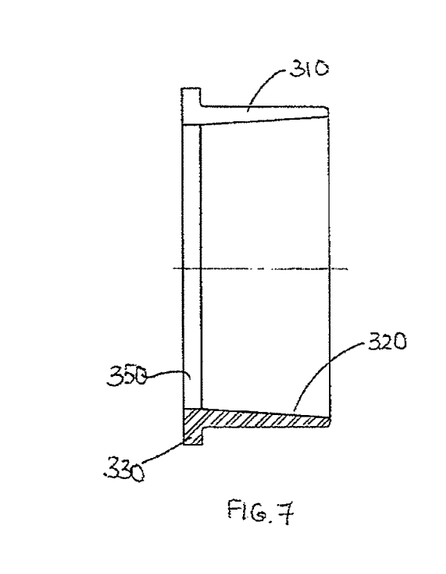
FIG. 7 illustrates a section VII-VII through the conical ring shown in FIG. 6.

Referring now to FIGS. 5 to 7, the conical split ring 300 is shown in more detail. The ring 300 has a cylindrical external surface 310 and a conical internal surface 320. A shoulder 330 is provided on the cylindrical external surface 310 as shown. A single split 340 is provided in the split ring 300. The conical internal surface 320 is substantially co-extensive with the cylindrical external surface 310 and terminates in an internal cylindrical portion 350 that is substantially co-extensive with the shoulder 330.

Although a single split 340 is provided in the split ring 300, it will be understood that the split ring 300 could also be formed by a multi-segment ring comprising a plurality of segments disposed so as to form a ring.

Returning now to the FIGS. 1*a* to *d*, the first end 230 of the drive shaft 210 of the drive roller 200 is mounted within the machine 100 by means of the ball bearing 110, which is mounted in the frame 103 of the machinery. Between an inner diameter of the ball bearing 110 and the first end 230 the split ring 300 is applied in such a manner that the inner diameter of the ball bearing 110 sits on the cylindrical external surface 310 of the conical split ring 300. The mounting of the conical split ring 300 is described in more detail below. A circlip 120 is located in the frame of the cutting machinery in order to retain the ball bearing 110 in its position in the frame. A lock washer 130 and an associated lock nut 135 are mounted on the threaded portion 232 of the first end 230.

The second end 240 of the drive shaft 210 is retained in the machine 100 by means of the ball bearing 140 mounted in a housing 400 that is screwed to the frame in the machine 100 using a plurality of screws 150. The screws 150 may be of any suitable size and configuration but those used in this embodiment are designated as DIN 912-M8×10. The ball bearing 140 is mounted on the cylindrical portion 246 of the drive shaft 210. A gearwheel 160 is mounted on the cylindrical portion 244 of the drive shaft 210. The gearwheel 160 forms part of a gear train 106 that provides drive from a motor (not shown) to the drive roller 200. A circlip 170 is located within the housing 400 to retain the ball bearing 140 within the housing 400 as will be described in more detail with reference to FIGS. 8 to 10 below. A lock washer 180 and a lock nut 185 retain the gearwheel 160 in position on the drive shaft 210. A cover 500 is fixed to the machine 100 using screws 190 over the housing 400 and the gearwheel 160, as shown in FIG. 1*a+d*. The cover 500 will be described in more detail with reference to FIGS. 11 to 13 below.

The lock washers 130 and 180 together with their associated lock nuts 135 and 185 provide an anti-vibration fixing for the drive roller 200 and prevent that during operation of the machine 100 the lock nuts get unlocked. The lock nuts 135 and 185 may comprise any suitable size appropriate for the size of thread on threaded portions 232 and 242 of the drive shaft 210. Here, the threaded portions 232 and 242 preferably have the same thread and therefore nuts 135 and 185 are the same. Whilst any suitable thread and nut can be provided, in this case, the nut is designated as DIN 1804-M30×1.5. The lock washers 130 and 180 are compatible with an M30 thread.

It will be appreciated that although the threaded portions 232 and 242 have been described as having the same thread size, it is possible that the threaded portions may have different thread sizes and therefore the lock nuts and associated lock washers would be chosen to match the different thread sizes.

Figure 8:
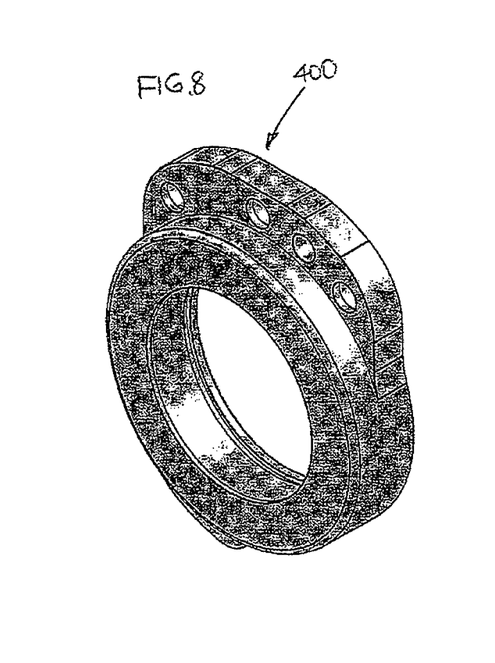
FIG. 8 illustrates a perspective view of a ball bearing housing in accordance with the present invention.
Figure 9:
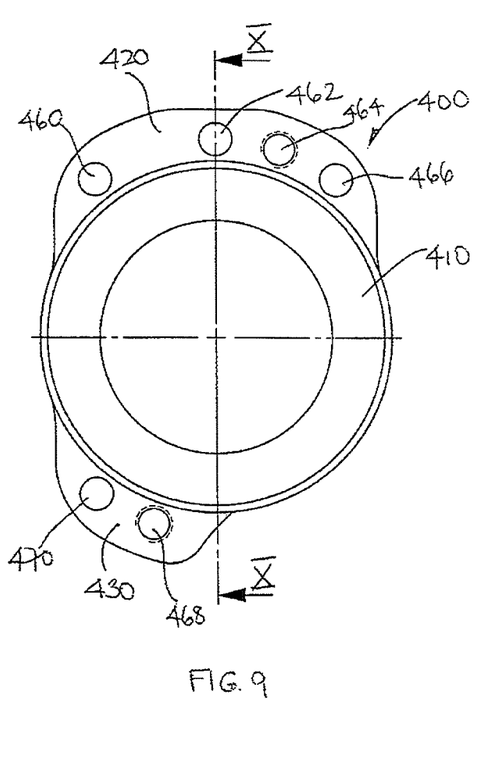
FIG. 9 illustrates a plan view of the ball bearing housing shown in FIG. 8.
Figure 10:
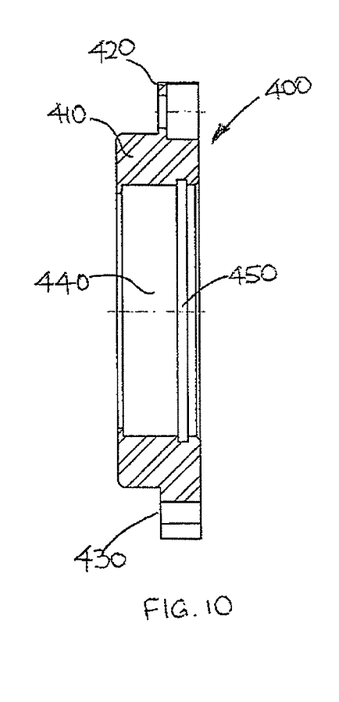
FIG. 10 illustrates a section X-X through the ball bearing housing shown in FIG. 9.

Referring now to FIGS. 8 to 10, the housing 400 for the ball bearing 140 will be described in more detail. The housing 400 has a body portion 410 that is shaped to have two flange members 420 and 430 as shown. The flange members 420, 430 have a plurality of mounting holes 460, 462, 464, 466, 468, 470 by way of which the housing 400 can be attached to the frame of the machine 100 using screws 150 (FIG. 1*a*).

The body portion 410 has a generally cylindrical central portion 440 that is sized to receive the ball bearing 140. An annular slot or groove 450 is provided within a cylindrical wall of the central portion 440 for receiving the circlip 170 (FIG. 1*c*), the circlip 170 retaining the ball bearing 140 in position when assembled.

Figure 11:
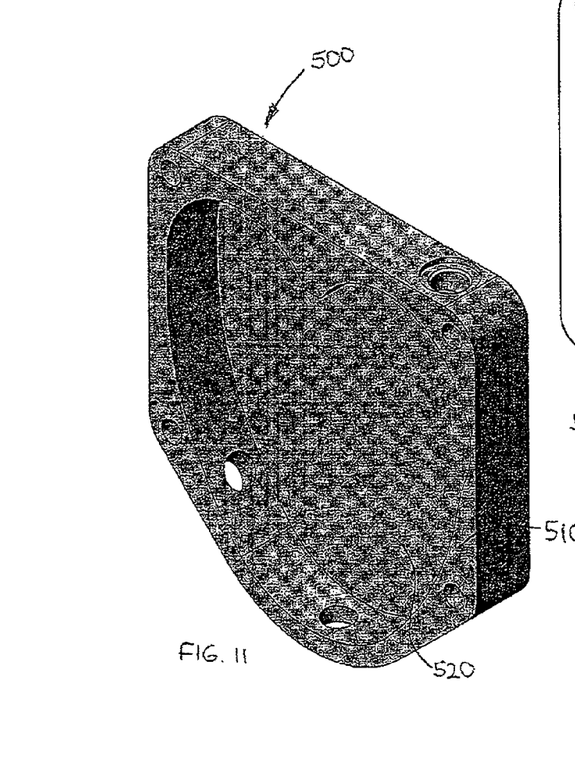
FIG. 11 illustrates a perspective view of a cover for the drive roller assembly in accordance with the present invention.
Figure 12:
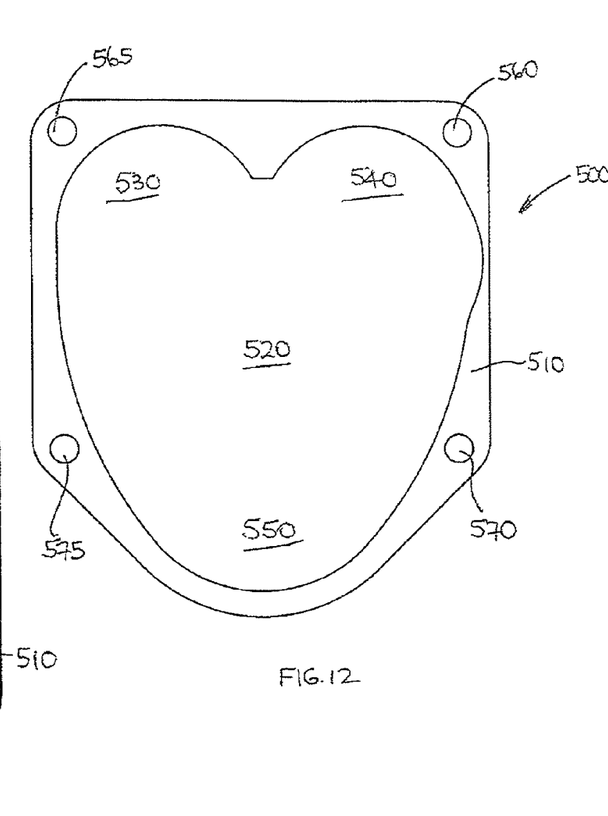
FIG. 12 illustrates a plan view of the cover shown in FIG. 11.
Figure 13:
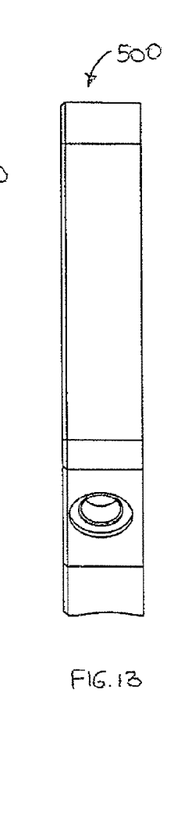
FIG. 13 illustrates an end elevation of the cover shown in FIG. 12.

Turning now to FIGS. 11 to 13, the cover 500 is shown. The cover 500 has a body portion 510 that includes a shaped recess 520. The shaped recess 520 has regions 530, 540, 550 that correspond to parts of the gear train 106 shown in FIG. 1*a*. The region 530 corresponds to the region that covers the gearwheel 160 (FIG. 1*a*).

A drive roller assembly in accordance with the present invention is obtained by assembling the drive roller 200 with the components described above with reference to FIGS. 1 to 13.

When demounting the drive roller, the ball bearing 110 generally remains in place into the frame where it is retained by the circlip 120. Upon mounting, respectively demounting, the drive roller 200 the first end 230 thereof is engaged in, respectively disengaged from the split ring 300. The split ring 300 engages with its conical internal surface 320 on the conical external surface portion 234 of the drive shaft 210. The lock washer 130 and lock nut 135 are mounted on the threaded portion 232 of the first end 230 of the shaft 210 and serve to fix the drive shaft on its first end to the frame.

As the lock nut 135 is screwed onto the threaded portion 232, the lock washer 130 is pushed forward and abuts the shoulder portion 330 of the split ring 300. Further screwing of the lock nut pushes the split ring 300 towards the roller portion 220, while the split ring engages into the ball bearing 110 so that its cylindrical external surface 310 faces the cylindrical inner surface of the ball bearing. As the split ring 300 moves with respect to the roller portion 220, its internal conical surface 320 engages with and moves over the external conical surface 234 of the drive shaft 210. This narrows the slot 340 so that the split ring 300 engages both the drive shaft 210 via the conical external surface 234 and the bearing 110 thereby securely positioning the first end 230 of the drive shaft 210 and the bearing 110 with respect to each other.

At the second end 240 of the drive roller 200, the ball bearing 140 is mounted within the housing 400 within the central cylindrical portion 440 (FIG. 10) and retained in position by the circlip 170 engaging slot or groove 450 formed within the central cylindrical portion 440 of the housing 400 as shown in FIG. 10. Once the ball bearing 140 is in place and the drive roller 200 mounted in the frame, the housing 400 is placed over the second end 240 (FIG. 3) so that a cylindrical inner surface (not shown) of the ball bearing 140 sits on the cylindrical portion 246. The housing 400 is attached to the frame 103 of the machine 100 by means of screws 150. Gearwheel 160 is mounted on cylindrical portion 244 adjacent the housing 400 and retained in place by means of lock washer 180 and lock nut 185. Cover 500 is then placed over the entire second end 240 including the housing 400 and the gearwheel 160. The cover 500 is screwed in position using screws 190, the gearwheel 160 lying within recess portion 530 of the cover 500 (FIG. 12). Screws 190 may be of any suitable size and configuration but those used in this embodiment are designated as DIN 912-M12×40. In doing so, the drive roller 200 is now located within a drive belt 102 and able to make contact with the drive belt to transmit drive from a motor (also not shown) to the drive belt via the gear train 106.

It will be appreciated that the drive roller assembly comprising the drive roller 200, the housing 400, the ball bearing 140 maintained by the circlip 170 can be constructed prior to it being inserted into the machine 100 each time the drive roller assembly is mounted in the machine. Whenever the drive belt is replaced, the entire drive roller assembly will be removed and replaced as a single unit.

When the drive roller assembly needs to be demounted, for example for replacing the drive belt 102, first the lock nut 135 and the washer 130 are released on the first end 230 of the drive roller 200 so as to free the one lateral side of the drive roller. Thereafter the cover 500 is removed by unscrewing the screws 190. This causes the lock nut 185 and the washer 180 to become accessible. Unscrewing the lock nut 185 will enable the demounting of the gear wheel 160. Once the latter has been demounted the housing 400 can be removed from the frame of the machine 100 by unscrewing the screws 150. As the ball bearing 140 is lodged in the housing 400, demounting the housing will cause a demounting of the ball bearing 140, which thereby remains in the housing as it is maintained by the circlip 170. Once the housing 400 is demounted it allows the entire drive roller assembly to be extracted from the machine 100 with the bearing 140 still mounted on the second end 240 of the drive shaft 210. In such a manner only a limited number of components need to be removed from the frame upon replacement of the drive belt and/or the drive shaft.

The present invention allows thus the easy replacement of the drive belt in the cutting machine as well as easy removal of the drive roller. This is achieved by a system that has been carefully designed to provide easy and precise positioning and re-positioning of the drive roller whilst substantially eliminating wear caused by repeated dismantling. Indeed as the ball bearing 110 remain in place in the frame and the ball bearing 140 remains in the housing the probability of an incorrect positioning of the ball bearings is substantially reduced, which on its turn leads to a reduction of wear due to an incorrect positioning of the ball bearings. Also the use of the split ring enables a correct positioning of the drive roller in the ball bearing 110. The fact the ball bearing 140 is lodged in the housing 400 also enables an easy and correct mounting of the ball bearing 140.

At one end of the drive roller, a split ring allows the precise alignment of the drive roller with respect to the bearing and retains the bearing in place on the frame each time the drive belt is changed. At the other end of the drive roller, on the side where the gear train is located for transmitting drive from a drive motor to the drive roller, the housing in which the ball bearing is located permits the extraction of the drive roller and its bearing without requiring access to the interior of the machine. This also allows the drive roller assembly to be extracted without having to dismantle too much of the neighbouring mechanism, for example, the gear wheels associated with the gear train.

As can be seen in FIG. 9 the housing 400 comprises holes 464 and 468 on opposite side thereof. These holes enable to apply a hub puller if force is required for removal of the housing. Indeed the arms of the hub puller can penetrate through the holes and apply a force on the frame thereby pushing the housing away from the frame.

The invention claimed is:

1. A machine comprising a frame and a drive roller assembly mounted in the frame, the machine further comprising a first and a second bearing for mounting the drive roller assembly, the drive roller assembly comprising a shaft having a first end and a second end, and on which a drive roller is mounted between the first end and the second end, the first end of the shaft being lodged in the first bearing and the second end of the shaft being lodged in the second bearing, the drive roller assembly also comprises a drive member attached to the second end of the shaft, wherein the drive roller assembly further comprises a split ring located on the first end of the shaft between the first bearing and the first end of the shaft, the split ring having a conical surface that positions the first end of the shaft relative to the first bearing, the second bearing being mounted in a housing, which is removably mounted on the frame, and wherein the conical surface of the split ring is an internal surface thereof, the first end of the shaft having a conical external surface part that engages with the conical internal surface of the split ring.

2. The machine according to claim 1, wherein the split ring has a cylindrical external surface on which the first bearing is located.

3. The machine according to claim 1, wherein the drive roller assembly further comprises a locking arrangement that effects fixing of the first bearing relative to the frame.

4. The machine according to claim 1, wherein the drive roller assembly further comprises a further locking arrangement that effects fixing of the second bearing within the housing.

5. The machine according to claim 1, wherein the surface of the split ring comprises a shoulder extending outwardly from the conical surface of the split ring.

6. The machine according to claim 3, wherein the first end of the shaft includes a threaded portion and the locking arrangement comprises a nut that engages the threaded portion and abuts the surface of the split ring to move the split ring towards the drive roller to fix the first bearing in position.

7. The machine according to claim 1, wherein a gearwheel is provided, which is mounted on the second end outside the housing.

8. The machine according to claim 1, wherein a cover is provided for being mounted over the housing.

9. A drive roller assembly as part of the machine according to claim 1.

10. The machine according to claim 2, wherein the surface of the split ring comprises a shoulder extending outwardly from the conical surface of the split ring.

11. The machine according to claim 2, wherein the drive roller assembly further comprises a locking arrangement that effects fixing of the second bearing within the housing.

12. The machine according to claim 3, wherein the drive roller assembly further comprises a further locking arrangement that effects fixing of the second bearing within the housing.

13. The machine comprising a frame and a drive roller assembly mounted in the frame, the machine further comprising a first and a second bearing for mounting the drive roller assembly, the drive roller assembly comprising a shaft having a first end and a second end, and on which a drive roller is mounted between the first end and the second end, the first end of the shaft being lodged in the first bearing and the second end of the shaft being lodged in the second bearing, the drive roller assembly also comprises a drive member attached to the second end of the shaft, wherein the drive roller assembly further comprises a split ring located on the first end of the shaft between the first bearing and the first end of the shaft, the split ring having a conical surface that positions the first end of the shaft relative to the first bearing, the second bearing being mounted in a housing, which is removably mounted on the frame; and wherein the drive roller assembly further comprises a locking arrangement that effects fixing of the first bearing relative to the frame, the first end of the shaft including a threaded portion, and the locking arrangement comprises a nut that engages the threaded portion and abuts the surface of the split ring to move the split ring towards the drive roller to fix the first bearing in position.

14. The machine according to claim 13, wherein a gearwheel is provided, which is mounted on the second end outside the housing.

15. A drive roller assembly as part of the machine according to claim 13.

16. The machine comprising a frame and a drive roller assembly mounted in the frame, the machine further comprising a first and a second bearing for mounting the drive roller assembly, the drive roller assembly comprising a shaft having a first end and a second end, and on which a drive roller is mounted between the first end and the second end, the first end of the shaft being lodged in the first bearing and the second end of the shaft being lodged in the second bearing, the drive roller assembly also comprises a drive member attached to the second end of the shaft, wherein the drive roller assembly further comprises a split ring located on the first end of the shaft between the first bearing and the first end of the shaft, the split ring having a conical surface that positions the first end of the shaft relative to the first bearing, the second bearing being mounted in a housing, which is removably mounted on the frame; and wherein the drive roller assembly further comprises a further locking arrangement that effects fixing of the second bearing within the housing, the first end of the shaft including a threaded portion and the locking arrangement comprises a nut that engages the threaded portion and abuts the surface of the split ring to move the split ring towards the drive roller to fix the first bearing in position.

17. The machine according to claim 16, wherein a gearwheel is provided, which is mounted on the second end outside the housing.

18. A drive roller assembly as part of the machine according to claim 16.

* * * * *